US008923459B2

United States Patent
Aula et al.

(10) Patent No.: US 8,923,459 B2
(45) Date of Patent: Dec. 30, 2014

(54) CHANNEL QUALITY ESTIMATION

(71) Applicant: Renesas Mobile Corporation, Tokyo (JP)

(72) Inventors: Janne Ari Olavi Aula, Haukipudas (FI); Mads Hintz-Madsen, Oulu (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/895,404

(22) Filed: May 16, 2013

(65) Prior Publication Data

US 2013/0308734 A1    Nov. 21, 2013

(30) Foreign Application Priority Data

May 16, 2012    (GB) .................................. 1208622.9

(51) Int. Cl.
*H04B 1/10*        (2006.01)
*H04L 25/02*       (2006.01)

(52) U.S. Cl.
CPC .................................. *H04L 25/0206* (2013.01)
USPC ........... 375/349; 375/316; 375/346; 370/320; 370/332; 370/335; 370/343; 370/437

(58) Field of Classification Search
CPC ... H04B 7/0877; H04B 1/1027; H04L 1/0026
USPC ........... 375/148; 370/252, 311, 328, 329, 332
See application file for complete search history.

(56) References Cited

U.S. PATENT DOCUMENTS

| 7,706,329 | B2 | 4/2010 | Lindoff et al. | |
|---|---|---|---|---|
| 2005/0130713 | A1 | 6/2005 | Simpson et al. | |
| 2010/0279702 | A1* | 11/2010 | Kazmi et al. | 455/452.2 |
| 2012/0099471 | A1* | 4/2012 | Brannstrom et al. | 370/252 |
| 2012/0120860 | A1* | 5/2012 | Chui et al. | 370/311 |

FOREIGN PATENT DOCUMENTS

| EP | 2182754 A1 | 5/2010 |
|---|---|---|
| WO | 2009002249 A2 | 12/2008 |
| WO | 2009075617 A1 | 6/2009 |

OTHER PUBLICATIONS

3G Americas, "UMTS Evolution From 3GPP Release 7 to Release 8", Jul. 8, 2008, pp. 1-96, Retrieved: <URL: http://www.4gamericas.org/documents/3GPPRel-7andRel-8_White_Paper07-08-08.pdf>.*

* cited by examiner

*Primary Examiner* — Daniel Washburn
*Assistant Examiner* — Eboni Hughes
(74) *Attorney, Agent, or Firm* — Stanton IP Law

(57) ABSTRACT

In a wireless modem which comprises a first receiver and a second receiver it is detected whether or not user data transmission is taking place. If user data transmission is detected, a second channel quality value is continuously estimated using the second receiver. If no user data transmission is detected, the second receiver is shut off, a first channel quality value is continuously estimated using the first receiver, and the second channel quality value of the second receiver is continuously estimated using the first channel quality value estimated by the first receiver.

16 Claims, 2 Drawing Sheets

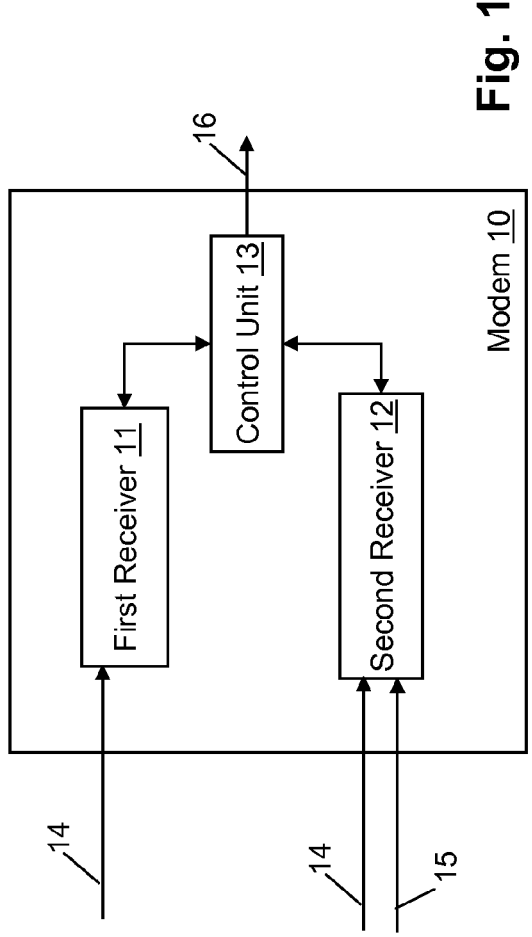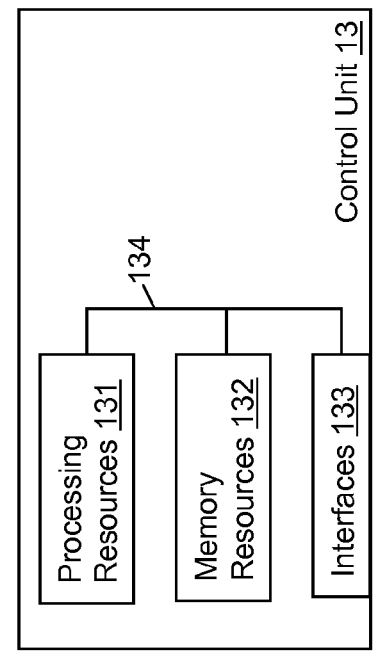

CHANNEL QUALITY ESTIMATION

CROSS REFERENCE TO RELATED APPLICATION

This application claims benefit under 35 U.S.C. §119(a) and 37 CFR 1.55 to UK patent application no. GB 1208622.9, filed on 16 May 2012, the entire content of which is hereby incorporated by reference.

TECHNICAL FIELD

The present disclosure relates to channel quality estimation. In particular, but not exclusively, the present disclosure relates to channel quality estimation and control channel reception during user data transmission gaps.

BACKGROUND

Prior art which is related to this technical field can for example be found in:
[1] US 2010/279702 A1;
[2] U.S. Pat. No. 7,706,329 B2.
The following meanings for the abbreviations used in this specification apply:
CQ channel quality information
HSDPA high speed downlink packet access
HS-DSCH high speed downlink shared channel
HS-SCCH high speed shared control channel
UE user equipment Receiver algorithms for high bit rate data services are typically complicated and power consuming. Existing receiver architectures require operation of advanced receivers continuously regardless of the bursty nature of data transmission. This is due to specifications often requiring a UE to evaluate a channel quality all the time and, at the same time, to receive a control channel such as HS-SCCH.

SUMMARY

The present disclosure assists in reducing power consumption for channel quality estimation and control channel reception. In particular, the present disclosure assists in reducing power consumption of advanced receivers for a high speed data communication method, for example HSDPA. Such results are achieved at least in part by the method and apparatus as defined in the appended claims. Embodiments may also be implemented by a computer program product.

At least one embodiment allows shutting down of an advanced receiver every time there is a user data transmission gap.

In accordance with first embodiments, there is a method for use in a wireless modem, the wireless modem including a first receiver and a second receiver, the method including:
detecting whether or not user data transmission via the wireless modem is taking place;
in response to user data transmission being detected, continuously executing the following:
estimating a second channel quality value using the second receiver; and
in response to no user data transmission being detected, executing the following:
shutting off the second receiver;
continuously estimating a first channel quality value using the first receiver; and
continuously estimating the second channel quality value of the second receiver using the first channel quality value estimated by the first receiver.

In accordance with second embodiments, there is a computer program product for use in a wireless modem, the wireless modem including a first receiver and a second receiver, the computer program product including a non-transitory computer-readable storage medium having computer readable instructions stored thereon, the computer readable instructions being executable by a computerized device to cause the computerized device to perform a method including:
detecting whether or not a user data transmission via the wireless modem is taking place;
in response to user data transmission being detected, continuously executing the following:
causing the second receiver to estimate a second channel quality value; and
in response to no user data transmission being detected, executing the following:
shutting off the second receiver;
causing the first receiver to continuously estimate a first channel quality value; and
continuously estimating the second channel quality value of the second receiver using the first channel quality value estimated by the first receiver.

In accordance with third embodiments, there is apparatus for use in a wireless modem, the wireless modem including:
a first receiver;
a second receiver; and
a control unit;
at least one processor; and
at least one memory including computer program code, the at least one memory and the computer program code being configured to, with the at least one processor, cause the control unit at least to detect whether or not user data transmission via the wireless modem is taking place,
wherein, in response to the control unit detecting user data transmission, the at least one memory and the computer program code is configured to, with the at least one processor, cause the control unit to continuously:
cause the second receiver to estimate a second channel quality value: and
wherein, in response to the control unit not detecting user data transmission, the at least one memory and the computer program code is configured to with the at least one processor, cause the control unit to:
shut off the second receiver;
continuously cause the first receiver to estimate a first channel quality value; and
continuously estimate the second channel quality value of the second receiver using the first channel quality value estimated by the first receiver.

Further features and advantages of embodiments will become apparent from the following description of preferred embodiments, given by way of example only, which is made with reference to the accompanying drawings.

BRIEF DESCRIPTION OF THE DRAWINGS

FIG. 1 shows a schematic block diagram illustrating a structure of a modem according to an embodiment.

FIG. 3 shows a simplified block diagram of a control unit 13 illustrated in FIG. 1, which is suitable for use in practicing embodiments.

DETAILED DESCRIPTION

Figure 2:
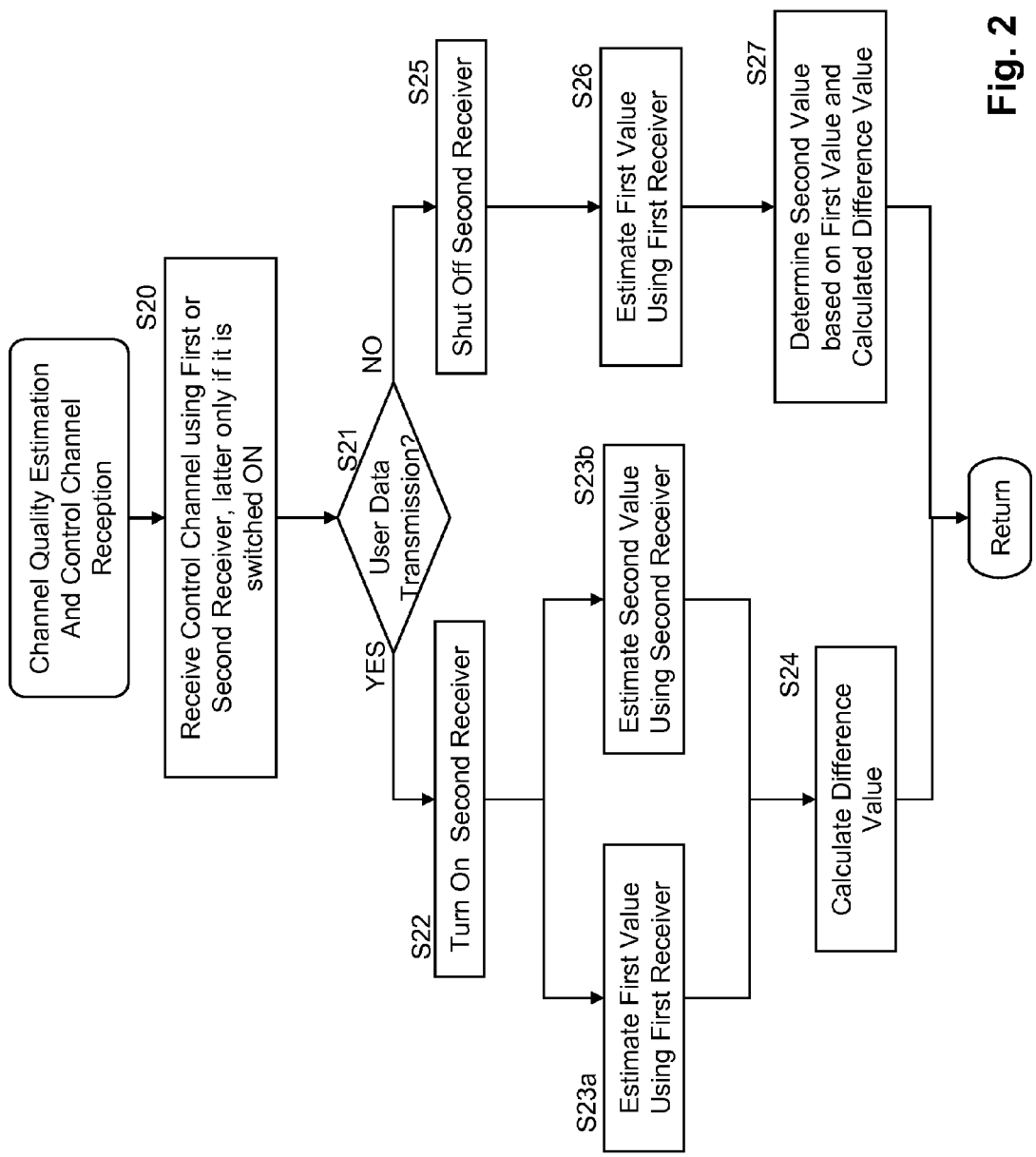
FIG. 2 shows a flow chart illustrating a process of a channel quality estimation and control channel reception method according to an embodiment.

FIG. 1 shows a wireless modem 10 according to an embodiment, which includes a first receiver 11, a second receiver 12, and a control unit 13. The first receiver 11 receives a number of channels 14 not including a data channel. The second receiver 12 receives a data channel 15 in addition to a number of channels 14. The control unit 13 outputs data on a link 16.

It is to be noted that merely a receiving side of the modem 10 is shown in FIG. 1, and the modem 10 may include further components for operation which are not illustrated in FIG. 1 as they are not relevant for the description of embodiments.

The first receiver 11 may be a relatively low power consumption receiver, and the second receiver 12 may be relatively high power consumption receiver such as an advanced high power consumption receiver. In embodiments, the first receiver 11 includes a relatively low complexity receiver, such as a (known) RAKE receiver, and the second receiver 12 includes a relatively high complexity receiver for HSDPA, such as a (known) equalizer receiver.

The wireless modem 10 may be part of a user equipment (UE) in a mobile communications network. A used communication method may be HSDPA; in such a case, the data channel may be an HS-DSCH channel, and the number of channels 14 may include a control channel such as an HS-SCCH channel.

The first and second receivers 11, 12 estimate channel quality values, for example CQI values, to be reported to a NodeB of the mobile communications network.

FIG. 2 shows a flowchart illustrating a process of channel quality estimation and control channel reception according to an embodiment, in which the wireless modem 10 may be used.

In step S20, a control channel, for example HS-SCCH, is received by the first receiver 11 or, if turned on, by the second receiver 12.

In step S21, it is detected whether there is user data transmission according to a high speed communication method between a UE including the wireless modem 10 and a NodeB of a mobile communications network. The detection may be performed by the control unit 13 based on an output signal from the first/second receiver 11, 12 listening to the control channel.

In the case of there being user data transmission (YES in step S21), the process advances to step S22 in which the second receiver 12 is turned on.

Then, in step S23a a first channel quality value may be estimated using the first receiver, for example the first receiver 11.

In step S23b, a second channel quality value may be estimated using the second receiver, for example the second receiver 12.

The control unit 13 may cause the first and second receivers 11, 12 to perform the above-described estimation.

In step S24, a difference between the first and second channel quality values may be calculated as a difference value, and the difference value may be averaged with each execution of the above steps S23a and S23b, thereby obtaining an averaged difference value in channel quality. Step S24 may be executed by the control unit 13.

In the case of there being user data transmission, the second channel quality value is reported to the NodeB. For example, the control unit 13 may forward the second channel quality value using the link 16 to a transmitter (not shown) for transmitting the second channel quality value to the NodeB.

In the case of there being no user data transmission, for example in case of a user data transmission gap, (NO in step S21), the process advances to step S25 in which the second receiver is shut off.

In step S26, a first channel quality value is estimated using the first receiver, and in step S27 the second channel quality value is determined from the first channel quality value. In embodiments, the second channel quality value is determined from the first channel quality value and the (averaged) difference value calculated in step S24.

The control unit 13 may cause the first receiver 11 to perform the above-described estimation. In addition, the control unit 13 may be involved in the determination by adding the (averaged) difference value to the first channel quality value output from the first receiver 11.

The second channel quality value determined in step S27 is reported to the NodeB. For example, the control unit 13 may forward this channel quality value using the link 16 to a transmitter (not shown) for transmitting it to the NodeB.

Thus, in the case of there being user data transmission, the wireless modem 10 runs the first and second receivers 11, 12 in parallel. According to an implementation example. HS-DSCH CQI estimation algorithms are designed and implemented in both the first and second receivers utilizing data available in those receivers. The CQI estimation algorithm in the second receiver is assumed to output a "correct" channel quality value (CQI value), whereas the CQ estimation algorithm in the first receiver typically results in a lower channel quality value different from the "correct" channel quality value due to the first receiver being a low power consumption and thus worse performing receiver.

The difference between the CQI values given by the two different CQI estimation algorithms may be continuously calculated (and averaged) whenever both are available.

In HS-DSCH transmission gaps, when there are no HS-DSCH packages scheduled for the UE, the second receiver is shut down completely. The first receiver is operated continuously and the CQI value reported to the NodeB may be based on the first receiver CQI estimation and the current difference value.

The estimation of a high power consumption receiver CQI value using a simple low power consumption receiver, for example a RAKE receiver in HIS-DSCH, allows the high power consumption receiver to be shut down during user data transmission gaps, thus saving a significant amount of power.

Reference is now made to FIG. 3 for illustrating a simplified block diagram of the control unit 13 that, in connection with the first and second receivers, is suitable for use in practicing embodiments.

The control unit 13 includes processing resources 131, memory resources 132 and interfaces 133, which are connected through a link 134. The memory resources 132 may store one or more programs, and the interfaces 133 may be coupled to the first and second receivers 11, 12 shown in FIG. 1. The interfaces 133 may also be coupled to the link 16.

The control unit 13 may execute the process of steps S21, S22, S24, S25, S27 as mentioned above, by using its processing resources 131, memory resources 132 and interfaces 133. Moreover, the control unit 13 may cause the receivers 11, 12 to perform the estimations as described above, by using its processing resources 131, memory resources 132 and interfaces 133.

The terms "connected," "coupled." or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

In general, embodiments may be implemented by computer software stored in the memory resources 132 and executable by the processing resources 131, or by hardware, or by a combination of software and/or firmware and hardware. Further in this regard it should be noted that the various process step descriptions above may represent interconnected circuitries.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a processing system or combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term 'circuitry' would also cover an implementation of merely a processing system or processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or a similar integrated circuit in a server, a cellular network device, or other network device.

In general, the various embodiments of the user equipment including the modem 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory resources 132 may be of any type suitable for the local technical environment and may be implemented using any suitable data storage technology, such as semiconductor-based memory devices, magnetic memory devices and systems, optical memory devices and systems, fixed memory and removable memory. The processing resources 131 may be of any type suitable to the local technical environment, and may include one or more of general purpose computers, special purpose computers, microprocessors, digital signal processors (DSPs) and processors based on a multi-core processor architecture, as non-limiting examples.

According to embodiments, an apparatus such as the modem 10 shown in FIG. 1 includes first receiving means, for example the first receiver 11, second receiving means, for example the second receiver 12, and detecting means for detecting whether or not a user data transmission takes place. The apparatus includes controlling means for, in case the detecting means detect user data transmission, continuously causing the second receiving means to estimate a second channel quality value. In case the detecting means do not detect user data transmission, the controlling means shut off the second receiving means and continuously cause the first receiving means to estimate a first channel quality value. In addition, the apparatus includes estimating means for continuously estimating the second channel quality value of the second receiving means using the first channel quality value estimated by the first receiving means.

In case the detecting means detect the user data transmission, the controlling means may continuously cause the first receiving means to estimate the first channel quality value. In addition, the apparatus may include calculating means for calculating a difference between the first and second channel quality values, thereby obtaining a difference value in channel quality. The apparatus may include determining means for, when the detecting means do not detect user data transmission, determining the second channel quality value by adding the difference value to the first channel quality value estimated by the first receiving means when no user data transmission is detected.

The apparatus may include averaging means for, in case the detecting means detect the user data transmission, continuously averaging the difference value. When the detecting means do not detect user data transmission, the determining means may determine the second channel quality value by adding the averaged difference value to the first channel quality value estimated by the first receiving means when no user data transmission is detected.

The first receiving means may include a low power consumption receiver, and the second receiving means may include an advanced high power consumption receiver. In particular, the first receiving means may include a RAKE receiver, and the second receiving means may include an equalizer receiver.

The user data transmission may comply with a high speed communication method.

The detecting, controlling, determining, averaging, calculating and estimating means may be implemented by the processing resources 131, memory resources 132 and interfaces 133 of the control unit 13 illustrated in FIG. 3.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for use in a wireless modem, the wireless modem comprising a first receiver and a second receiver, the method comprising:

detecting whether or not user data transmission via the wireless modem is taking place; and in response to user data transmission being detected, continuously executing the following:
  estimating a first channel quality value of a first channel using the first receiver;
  estimating a second channel quality value of a second channel using the second receiver; and
  calculating a difference between the first channel quality of the first channel and the second channel quality value of the second channel, thereby obtaining a difference value in channel quality; else
in response to no user data transmission being detected, executing the following:
  shutting off the second receiver;
  continuously estimating the first channel quality value of the first channel using the first receiver; and
  continuously estimating the second channel quality value of the second channel using the first channel quality value of the first channel estimated by the first receiver;
  wherein when no user data transmission is detected, the second channel quality value of the second channel is estimated by adding the difference value to the first channel quality value of the first channel estimated by the first receiver when no user data transmission is detected.

2. The method according to claim 1, further comprising, in response to user data transmission being detected, continuously averaging the difference value,
  wherein when no user data transmission is detected, the second channel quality value of the second channel is estimated by adding the averaged difference value to the first channel quality value of the first channel estimated by the first receiver when no user data transmission is detected.

3. The method according to claim 1, wherein:
  the first receiver comprises a relatively low power consumption receiver, and/or
  the second receiver comprises a relatively high power consumption receiver.

4. The method according to claim 1, wherein:
  the first receiver comprises a RAKE receiver, and/or
  the second receiver comprises an equalizer receiver.

5. The method according to claim 1, wherein the user data transmission complies with a high speed communication method.

6. A computer program product for use in a wireless modem, the wireless modem comprising a first receiver and a second receiver, the computer program product comprising a non-transitory computer-readable storage medium having computer readable instructions stored thereon, the computer readable instructions being executable by a computerized device to cause the computerized device to perform a method comprising:
  detecting whether or not a user data transmission via the wireless modem is taking place; and
  in response to user data transmission being detected, continuously executing the following:
    causing the first receiver to estimate a first channel quality value of a first channel;
    causing the second receiver to estimate a second channel quality value of a second channel; and
    calculating a difference between the first channel quality of the first channel and the second channel quality value of the second channel, thereby obtaining a difference value in channel quality; else
  in response to no user data transmission being detected, executing the following:
    shutting off the second receiver;
    causing the first receiver to continuously estimate the first channel quality value of the first channel; and
    continuously estimating the second channel quality value of the second channel using the first channel quality value of the first channel estimated by the first receive;
    wherein when no user data transmission is detected, the second channel quality value of the second channel is estimated by adding the difference value to the first channel quality value of the first channel estimated by the first receiver when no user data transmission is detected.

7. An apparatus for use in a wireless modem, the wireless modem comprising:
  a first receiver;
  a second receiver;
  a control unit;
  at least one processor; and
  at least one memory including computer program code, the at least one memory and the computer program code being configured to, with the at least one processor, cause the control unit at least to detect whether or not user data transmission via the wireless modem is taking place; and
  wherein, in response to the control unit detecting user data transmission, the at least one memory and the computer program code is configured to, with the at least one processor, cause the control unit to continuously:
    cause the first receiver to estimate a first channel quality value of a first channel;
    cause the second receiver to estimate a second channel quality value of a second channel; and
    calculate a difference between the first channel quality value of the first channel and the second channel quality value of the second channel, thereby obtaining a difference value in channel quality; else
  wherein, in response to the control unit not detecting user data transmission, the at least one memory and the computer program code is configured to, with the at least one processor, cause the control unit to:
    shut off the second receiver;
    continuously cause the first receiver to estimate the first channel quality value of the first channel;
    continuously estimate the second channel quality value of the second channel using the first channel quality value of the first channel estimated by the first receiver, wherein when no user data transmission is detected the second channel quality value of the second channel is estimated by adding the difference value to the first channel quality value of the first channel estimated by the first receiver.

8. The apparatus according to claim 7, wherein in response to the control unit detecting user data transmission, the at least one memory and the computer program code is configured to, with the at least one processor, cause the control unit to continuously average the difference value,
  wherein in response to the control unit not detecting user data transmission, the at least one memory and the computer program code is configured to, with the at least one processor, cause the control unit to estimate the second channel quality value of the second channel by adding the averaged difference value to the first channel quality value of the first channel estimated by the first receiver when no user data transmission is detected.

9. The apparatus according to claim 7, wherein:
the first receiver comprises a relatively low power consumption receiver, and/or
the second receiver comprises a relatively high power consumption receiver.

10. The apparatus according to claim 7, wherein:
the first receiver comprises a RAKE receiver, and/or
the second receiver comprises an equalizer receiver.

11. The apparatus according to claim 7, wherein the user data transmission complies with a high speed communication method.

12. The computer program product according to claim 6, wherein the computer readable instructions being executable by the computerized device to cause the computerized device to further perform:
in response to user data transmission being detected, continuously averaging the difference value,
wherein when no user data transmission is detected, the second channel quality value of the second channel is estimated by adding the averaged difference value to the first channel quality value of the first channel estimated by the first receiver when no user data transmission is detected.

13. The computer program product according to claim 6, wherein:
the first receiver comprises a relatively low power consumption receiver, and/or
the second receiver comprises a relatively high power consumption receiver.

14. The computer program product according to claim 6, wherein:
the first receiver comprises a RAKE receiver, and/or
the second receiver comprises an equalizer receiver.

15. The method according to claim 1, wherein the first channel quality value is a channel quality information (CQI) value.

16. The apparatus according to claim 7, wherein the first channel quality value is a channel quality information (CQI) value.

\* \* \* \* \*